United States Patent
Horner et al.

(10) Patent No.: US 12,464,218 B2
(45) Date of Patent: Nov. 4, 2025

(54) SYSTEMS AND METHODS FOR CHANGING PROGRAMS ON IMAGING DEVICES

(71) Applicant: ZEBRA TECHNOLOGIES CORPORATION, Lincolnshire, IL (US)

(72) Inventors: Matthew Lawrence Horner, Sound Beach, NY (US); Paul Seiter, Port Jefferson Station, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/869,381

(22) Filed: Jul. 20, 2022

(65) Prior Publication Data

US 2024/0031666 A1    Jan. 25, 2024

(51) Int. Cl.

| | |
|---|---|
| *H04N 23/617* | (2023.01) |
| *G01C 11/00* | (2006.01) |
| *H04N 23/61* | (2023.01) |
| *H04N 23/66* | (2023.01) |

(52) U.S. Cl.
CPC .......... *H04N 23/617* (2023.01); *G01C 11/00* (2013.01); *H04N 23/61* (2023.01); *H04N 23/66* (2023.01)

(58) Field of Classification Search
CPC .... G06K 9/00362; G08B 7/06; G06F 3/0482; G05B 12/02; H04N 7/186
See application file for complete search history.

(56) References Cited

U.S. PATENT DOCUMENTS

| | | | |
|---|---|---|---|
| 2014/0240318 A1* | 8/2014 | Coombe | G06T 19/003 345/427 |
| 2019/0089934 A1* | 3/2019 | Goulden et al. | H04N 7/186 |
| 2020/0020093 A1* | 1/2020 | Frei | A01B 69/001 |
| 2021/0012125 A1* | 1/2021 | Schmidt | H04W 4/40 |

* cited by examiner

*Primary Examiner* — Xi Wang

(57) ABSTRACT

Systems and methods for changing programs on imaging devices are disclosed herein. An example method includes capturing, by a first imaging device, an image of a target object, and transmitting the image of the target object to a leader device that is communicatively coupled to the first imaging device and a second imaging device. The second imaging device may be different from the first imaging device. The example method may further include analyzing, by the leader device, the image of the target object using a photogrammetric technique to determine a dimension of the target object, and changing a program executing on the second imaging device based on the dimension of the target object.

14 Claims, 5 Drawing Sheets

SYSTEMS AND METHODS FOR CHANGING PROGRAMS ON IMAGING DEVICES

BACKGROUND

Since the introduction of affordable machine vision systems, these systems have been rapidly adopted across a vast number of industries to suit an even larger number of purposes. In tandem with their adoption, developers have been consistently attempting to increase and maximize the accuracy of these machine vision systems. Machine vision may generally provide high fidelity image analysis, but may also suffer from a lack of accuracy when not properly configured for the imaging job at-hand. As such, properly configuring machine vision systems and maintaining such proper configuration when imaging task requirements change is a topic of great interest in a wide variety of industries.

However, properly configuring and maintaining the proper configuration of such machine vision systems is conventionally a time-intensive process that may drastically reduce the efficiency of the process imaged by the machine vision system. For example, conventional machine vision systems are typically implemented in production/manufacturing environments for visual inspections that must take place in order for the production/manufacturing to proceed. However, conventional machine vision systems require a user to manually upload and/or otherwise configure changes to the machine vision programs ("jobs") executed by the machine vision cameras. Consequently, conventional machine vision systems suffer from dramatically slow changes to the machine vision jobs executed by the machine vision cameras, which adversely impacts the system uptime of the production/manufacturing environment. Additionally, conventional changes to machine vision jobs executed by machine vision cameras suffer from numerous errors, resulting in the machine vision cameras executing the wrong machine vision jobs for the imaging job required as part of the inspection process.

Thus, there is a need for systems and methods for changing programs on imaging devices that allow for fast, efficient, and accurate imaging program changes.

SUMMARY

In an embodiment, the present invention is a method for changing programs on imaging devices. The method may comprise: capturing, by a first imaging device, an image of a target object; transmitting the image of the target object to a leader device that is communicatively coupled to the first imaging device and a second imaging device, wherein the second imaging device is different from the first imaging device; analyzing, by the leader device, the image of the target object using a photogrammetric technique to determine a dimension of the target object; and changing, by the leader device, a program executing on the second imaging device based on the dimension of the target object.

In a variation of this embodiment, the method further comprises: transmitting the image of the target object to the leader device that is communicatively coupled to the first imaging device and the second imaging device, wherein the second imaging device is a machine vision camera array configured to execute the program, and wherein the program is a machine vision job comprising one or more machine vision tasks.

In another variation of this embodiment, the program is stored on the first imaging device, and the method further comprises: executing, by the first imaging device, the program on the image of the target object; and transmitting results of executing the program to the leader device.

In yet another variation of this embodiment, the method further comprises: determining, by the leader device, that the target object represented in the image is a new target object based on the dimension of the new target object; retrieving a second program corresponding to the new target object; and changing, by the leader device, the program executing on the second imaging device from a first program to the second program based on the determining that the target object represented in the image is the new target object.

In still another variation of this embodiment, the method further comprises: analyzing, by the leader device, the image of the target object using a photogrammetric technique to determine a dimension of the target object; determining a dimension differential based on comparing the dimension of the target object to a prior object dimension; comparing the dimension differential to a dimension differential threshold; and responsive to determining that the dimension differential exceeds the dimension differential threshold, changing, by the leader device, the program executing on the second imaging device.

In yet another variation of this embodiment, the method further comprises: changing, by the leader device, the program executing on the second imaging device, wherein changes to the program include changing at least one of (i) a focus value, (ii) an exposure value, (iii) a scene-lighting configuration value, (iv) a program inspection step, (v) an activity status of the second imaging device.

In still another variation of this embodiment, the method further comprises: capturing, by the first imaging device, the image of the target object, wherein the image of the target object comprises two or more images of the target object.

In another embodiment, the present invention is a system for changing programs on imaging devices. The system comprises: a first imaging device configured to capture an image of a target object; and a leader device executing an application. The leader device is communicatively coupled to the first imaging device and is configured to: receive the image of the target object, analyze the image of the target object using a photogrammetric technique to determine a dimension of the target object, and change a program executing on a second imaging device based on the dimension of the target object, wherein the second imaging device is different from the first imaging device.

In a variation of this embodiment, the second imaging device is a machine vision camera array configured to execute the program, and wherein the program is a machine vision job comprising one or more machine vision tasks.

In another variation of this embodiment, the program is stored on the first imaging device, and the first imaging device is further configured to: execute the program on the image of the target object; and transmit results of executing the program to the leader device.

In yet another variation of this embodiment, the leader device is further configured to: determine that the target object represented in the image is a new target object based on the dimension of the new target object; retrieve a second program corresponding to the new target object; and change the program executing on the second imaging device from a first program to the second program based on the determining that the target object represented in the image is the new target object.

In still another variation of this embodiment, the leader device is further configured to: analyze the image of the target object using a photogrammetric technique to determine a dimension of the target object; determine a dimension differential based on comparing the dimension of the target object to a prior object dimension; compare the dimension differential to a dimension differential threshold; and responsive to determining that the dimension differential exceeds the dimension differential threshold, change the program executing on the second imaging device.

In yet another variation of this embodiment, the leader device is further configured to: change the program executing on the second imaging device, wherein changes to the program include changing at least one of (i) a focus value, (ii) an exposure value, (iii) a scene-lighting configuration value, (iv) a program inspection step, (v) an activity status of the second imaging device.

In still another variation of this embodiment, the first imaging device is further configured to: capture the image of the target object, wherein the image of the target object comprises two or more images of the target object.

In yet another embodiment, the present invention is a device for changing programs on imaging devices. The device comprises: one or more processors; and a non-transitory computer-readable memory coupled to the imaging apparatus and the one or more processors. The memory stores instructions thereon that, when executed by the one or more processors, cause the one or more processors to: receive an image of a target object captured by a first imaging device, analyze the image of the target object using a photogrammetric technique to determine a dimension of the target object, and change a program executing on a second imaging device based on the dimension of the target object, wherein the second imaging device is different from the first imaging device.

In a variation of this embodiment, the second imaging device is a machine vision camera array configured to execute the program, and wherein the program is a machine vision job comprising one or more machine vision tasks.

In another variation of this embodiment, the program is stored on the first imaging device, and the instructions, when executed, further cause the one or more processors to: receive results of executing the program on the image of the target object from the first imaging device; and disable the second imaging device from capturing images of the target object.

In yet another variation of this embodiment, the instructions, when executed, further cause the one or more processors to: determine that the target object represented in the image is a new target object based on the dimension of the new target object; retrieve a second program corresponding to the new target object; and change the program executing on the second imaging device from a first program to the second program based on the determining that the target object represented in the image is the new target object.

In still another variation of this embodiment, the instructions, when executed, further cause the one or more processors to: analyze the image of the target object using a photogrammetric technique to determine a dimension of the target object; determine a dimension differential based on comparing the dimension of the target object to a prior object dimension; compare the dimension differential to a dimension differential threshold; and responsive to determining that the dimension differential exceeds the dimension differential threshold, change the program executing on the second imaging device.

In yet another variation of this embodiment, the instructions, when executed, further cause the one or more processors to: change the program executing on the second imaging device, wherein changes to the program include changing at least one of (i) a focus value, (ii) an exposure value, (iii) a scene-lighting configuration value, (iv) a program inspection step, (v) an activity status of the second imaging device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
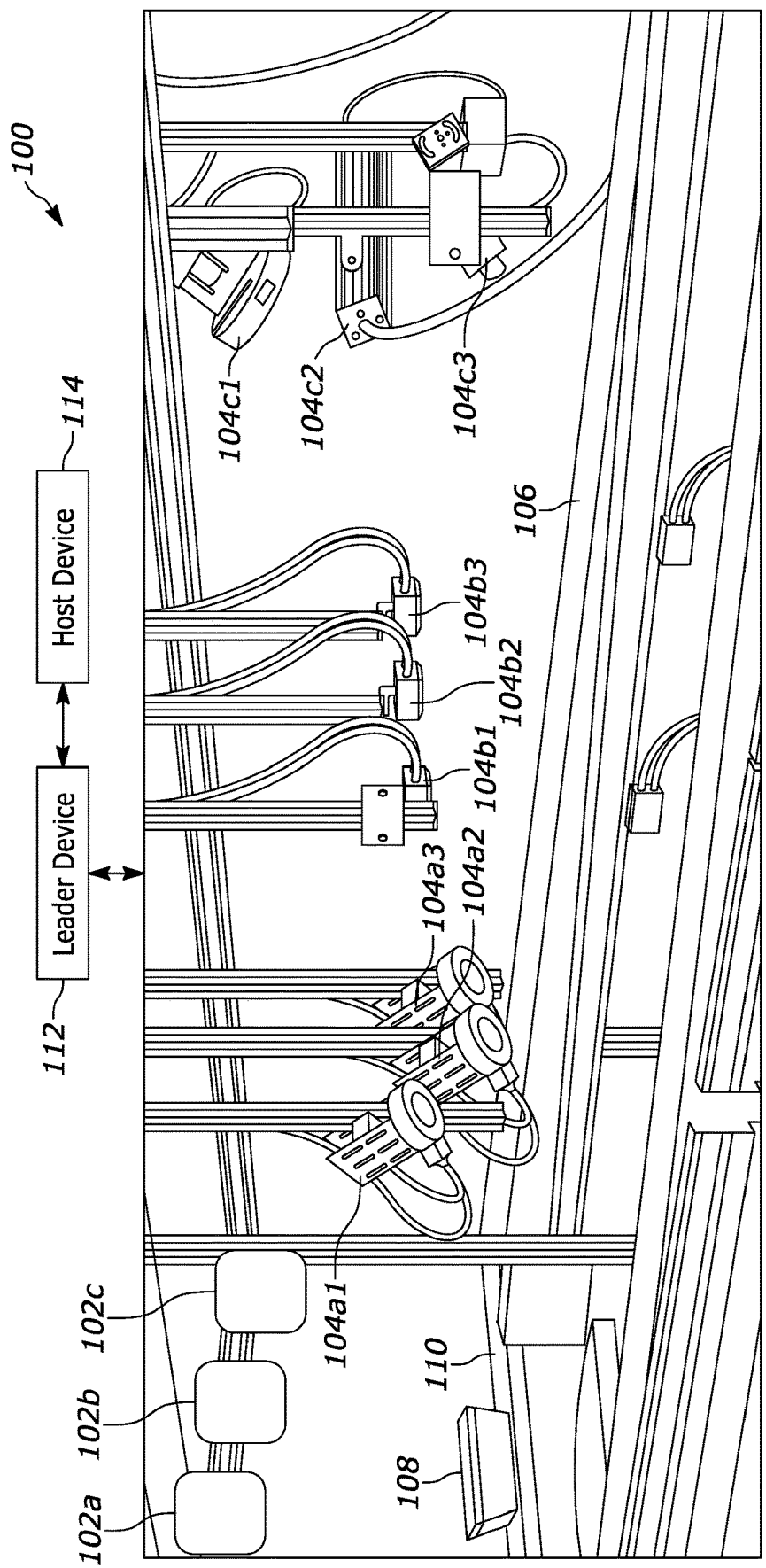
FIG. 1A depicts an example environment in which systems/devices for changing programs on imaging devices may be implemented, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, machine vision system owners/operators have conventionally been plagued with being unable to quickly and efficiently switch between/among machine vision jobs (referenced herein also as "programs") as the target objects imaged by the machine vision cameras change. Conventional machine vision systems require a user to manually upload and/or otherwise configure changes to these machine vision jobs; and as a result, conventional machine vision systems suffer from dramatically slow changes to the machine vision jobs executed by the machine vision cameras, which adversely impacts the system uptime of the production/manufacturing environment. Additionally, conventional changes to machine vision jobs executed by machine vision cameras suffer from numerous errors, resulting in the machine vision cameras executing the wrong machine vision jobs for the imaging job required as part of the inspection process.

Thus, it is an objective of the present disclosure to eliminate these and other problems with conventional machine vision systems by introducing imaging devices (referenced herein also as "scout devices," "first imaging devices," or "machine vision imaging devices") that are configured to capture an image of a target object that may be analyzed by a leader device to determine whether or not to change the machine vision jobs executing on other imaging devices (referenced herein also as "follower devices," "second imaging devices," or "machine vision imaging devices"). The systems and methods of the present disclosure thereby provide more accurate, efficient, and quick machine vision job changes than conventional machine vision systems. As described herein, the embodiments of the present disclosure may reduce the need for costly production downtime (e.g., taking production offline), expedite the machine vision job changes, minimize the occurrence of machine vision cameras executing wrong and/or otherwise non-optimal machine vision jobs, and generally ensure that the machine vision system maximizes image capture and processing efficiency and accuracy.

FIG. 1A depicts an example environment 100 in which systems/devices for changing programs on imaging devices may be implemented, in accordance with embodiments described herein. The example environment 100 may generally be an industrial setting that includes a set of scout devices 102a-c and a set of machine vision cameras 104a1-3, 104b1-3, 104c1-3 positioned over a conveyor belt 106. The belt 106 may carry a target object 108 across an entry point 110 where the set of scout devices 102a-c may capture images of the target object 108. These captured images may be transmitted to a leader device 112 for analysis, after which, the leader device 112 determines whether or not a program (machine vision job) currently executing on the set of machine vision cameras 104a1-3, 104b1-3, 104c1-3 should be changed. Thereafter, the target object 108 may travel along the conveyor belt 106 past each of the set of machine vision cameras 104a1-3, 104b1-3, 104c1-3 where image data is captured and analyzed by some/all of the set of machine vision cameras 104a1-3, 104b1-3, 104c1-3 and/or the leader device 112. The combination of the conveyor belt 106 and the set of machine vision cameras 104a1-3, 104b1-3, 104c1-3 may be referenced herein as a "scan tunnel".

More specifically, the set of machine vision cameras 104a1-3, 104b1-3, 104c1-3, may be organized in an array and may be arranged in a leader/follower configuration with the leader device 112. The set of machine vision cameras 104a1-3, 104b1-3, 104c1-3 are generally arranged as followers of the leader device 112, which is configured to trigger the machine vision cameras 104a1-3, 104b1-3, 104c1-3 to capture image data of the target object 108, organize results from each camera's image capture/inspection, and transmit the results and/or the captured images to a connected host device 114. Each camera of the set of machine vision cameras 104a1-3, 104b1-3, 104c1-3 stores a program for execution (e.g., a "job") that includes information regarding the respective camera's 104a1-3, 104b1-3, 104c1-3 image-capture parameters, such as focus, exposure, gain, specifics on the type of symbology targeted for decoding, or specific machine vision inspection steps.

Generally speaking, during operation of such a scan tunnel, target objects 108 on the conveyor belt 106 may change on a frequent basis (e.g., hourly, bi-hourly, etc.), based on each user's use case. When such a change of target objects 108 occurs, some/all of the set of machine vision cameras 104a1-3, 104b1-3, 104c1-3 may need to execute a different program in order to properly inspect the new target object 108. In conventional systems, changing programs executing on cameras located in the scan tunnel requires a user to manually perform the change, thereby increasing the need for user intervention, process interruption, and reducing overall system efficiency. However, the systems of the present disclosure represented in FIG. 1A overcome these issues experienced by conventional systems by utilizing the scout devices 102a-c to enable the leader device 112 to determine whether or not to change programs executing on the machine vision cameras 104a1-3, 104b1-3, 104c1-3 without requiring scan tunnel shutdown or any human intervention.

Each of the scout devices 102a-c may be located in a forward position relative to the set of machine vision cameras 104a1-3, 104b1-3, 104c1-3 in order to capture images of target objects 108 approaching the scan tunnel at/near the entry point 110. In certain aspects, the scout devices 102a-c may be triggered independently of the rest of the devices in the scan tunnel (e.g., the set of machine vision cameras 104a1-3, 104b1-3, 104c1-3). For example, the entry point 110 may include one or more laser beam triggers (not shown) that cause the scout devices 102a-c to capture images of the target object 108 when the target object 108 passes through the one or more laser beam triggers.

In any event, the scout devices 102a-c may transmit these images to the leader device 112 for analysis. The leader device 112 may then perform one or more dimensioning techniques, such as photogrammetry and/or any other suitable dimensioning technique or combinations thereof, with the images in order to determine a dimension of the target object 108 represented therein. However, a single imaging device may occasionally be insufficient to capture images that enable the leader device 112 to adequately determine the dimensions of the target object 108. Accordingly, it should be appreciated that the scout devices 102a-c may include any suitable number of devices in order to capture all images of the target object 108 simultaneously, take multiple image captures of the target object 108, and/or otherwise capture sufficient image data of the target object 108 to enable the leader device 112 to accurately determine the dimension of the target object 108. Moreover, the "dimension" of the target object 108 may include any suitable dimension (e.g., length, width, height, etc.) or combinations thereof.

As part of the dimensioning analysis, the leader device 112 may consume the scout device 102a-c images and may generate a dimension estimation (also referenced herein as a "dimension") of the target object 108. The leader device 112 may then compare the dimension estimation to a prior object dimension to determine a dimension differential. If the leader device 112 determines that the dimension differential exceeds a dimension differential threshold, then the leader device 112 may determine that the target object 108 located on the conveyor belt 106 is different from the prior target object corresponding to the prior object dimension. Consequently, the leader device 112 may change the program running on all connected followers, such as the set of machine vision cameras 104a1-3, 104b1-3, 104c1-3. As previously mentioned, changes to the programs executed on the machine vision cameras 104a1-3, 104b1-3, 104c1-3 may include changing imaging parameters (e.g., focus, exposure, brightness), scene-lighting configuration, and individual inspection steps. Changes to the programs may further include taking individual cameras and/or sets of cameras offline if the cameras are not required for the activities performed in order to process and/or otherwise inspect the new target object 108 on the conveyor belt 106.

Additionally, or alternatively, the scout devices 102a-c may capture images of the approaching target object 108 for dimensioning and/or to perform tasks associated with a program executing on the scout devices 102a-c. In other words, the scout devices 102a-c may also be machine vision cameras that are configured to capture images of the target object 108 and perform actions/steps in accordance with a machine vision job that is stored on each of the scout devices 102a-c. In this manner, the scout devices 102a-c may provide images of the target object 108 to the leader device 112 for dimensioning, as well as results of the machine vision job executed by the scout devices 102a-c upon capture of the images. The leader device 112 may then simultaneously and/or otherwise update the programs executing on the machine vision cameras 104a1-3, 104b1-3, 104c1-3 and evaluate the results from the analysis performed by the scout devices 102a-c. In certain aspects, the results obtained by the scout devices 102a-c may enable the leader device 112 to disable the machine vision cameras 104a1-3, 104b1-3, 104c1-3 from capturing images of the target object 108 as it proceeds along the conveyor belt 106, thereby creating energy savings for the user and managing thermal and computational loads on the machine vision cameras 104a1-3, 104b1-3, 104c1-3.

In certain aspects, the set of machine vision cameras 104a1-3, 104b1-3, 104c1-3 may be any suitable type of cameras/scanners, such as fixed industrial scanners (FIS). Further, it should be understood that the example environment 100 may be any suitable environment, and is not limited to an industrial setting or any other setting.

Figure 1B:
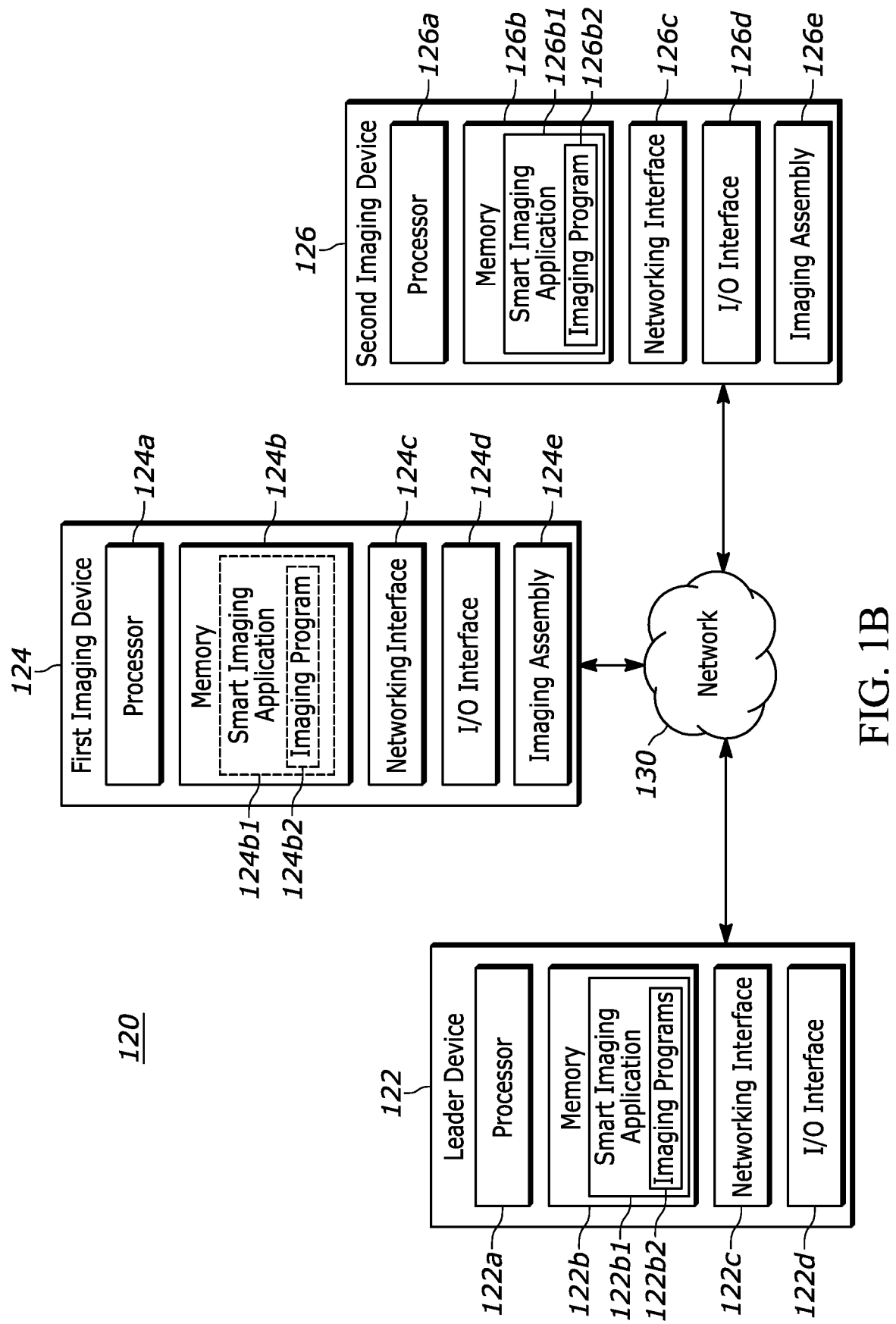
FIG. 1B is an example system for changing programs on imaging devices, in accordance with embodiments described herein.

FIG. 1B illustrates an example system 120 for changing programs on imaging devices, in accordance with various embodiments disclosed herein. In the example embodiment of FIG. 1B, the system 120 includes a leader device 122 that is communicatively coupled to a first imaging device 124 and a second imaging device 126 via a network 130. Generally speaking, the leader device 122, the first imaging device 124, and the second imaging device 126 may be capable of executing instructions to, for example, implement operations of the example methods described herein, as may be represented by the flowcharts of the drawings that accompany this description. Namely, the leader device 122 may be connected to the first imaging device 124 and the second imaging device 126 via a network 130, and may generally be configured to interpret and process information received from the imaging devices 124, 126.

As an example, the second imaging device 126 may obtain a job file containing one or more job scripts from the leader device 122 across the network 130 that may define the machine vision job and may configure the second imaging device 126 to capture and/or analyze images in accordance with the machine vision job. The second imaging device 126 may include flash memory used for determining, storing, or otherwise processing imaging data/datasets and/or post-imaging data. The second imaging device 126 may then receive, recognize, and/or otherwise interpret a trigger that causes the second imaging device 126 to capture an image of a target object (e.g., target object 108) in accordance with the configuration established via the one or more job scripts. Once captured and/or analyzed, the second imaging device 126 may transmit the images and any associated data across the network 130 to the leader device 122 for further analysis and/or storage. In various embodiments, the second imaging device 126 may be a "smart" camera and/or may otherwise be configured to automatically perform sufficient functionality of the second imaging device 126 in order to obtain, interpret, and execute job scripts that define machine vision jobs, such as any one or more job scripts contained in one or more job files as obtained, for example, from the leader device 122.

In any event, the leader device 122 is generally configured to enable a user/operator to, for example, create and upload a machine vision job for execution and/or otherwise interact with the first imaging device 124 and/or the second imaging device 126. The user/operator may transmit/upload any configuration adjustment, software updates, and/or any other suitable information to the second imaging device 126 via the network 130, where the information is then interpreted and processed accordingly. In certain aspects, the leader device 122 may comprise one or more operator workstations, and may include one or more processors 122a, one or more memories 122b, a networking interface 122c, an input/output (I/O) interface 122d, a smart imaging application 122b1, and a suite of imaging programs 122b2.

Generally, the smart imaging application 122b1 may include and/or otherwise comprise executable instructions (e.g., via the one or more processors 122a) that allow a user to configure a machine vision job and/or imaging settings of the second imaging device 126 and/or the first imaging device 124. For example, the smart imaging application 122b1 may render a graphical user interface (GUI) on a display (e.g., I/O interface 122d) of the leader device 122 or a connected device (e.g., host device 114), and the user may interact with the GUI to change various settings, modify machine vision jobs, input data, etc. Moreover, the smart imaging application 122b1 may output results of the executed machine vision job for display to the user, and the user may again interact with the GUI to approve the results, modify imaging settings to re-perform the machine vision job, and/or any other suitable input or combinations thereof.

The imaging programs 122b2 may include and/or otherwise comprise sets of executable instructions that, when transmitted to the imaging devices 124, 126, cause the first imaging device 124 and/or the second imaging device 126 to perform one or more tasks. In certain aspects, the one or more tasks included as part of the imaging programs 122b2 include machine vision tasks configured to cause the imaging devices 124, 126 to analyze captured images in accordance with one or more machine vision techniques. For example, an imaging program included as part of the imaging programs 122b2 may cause the first imaging device 124, when executed by the device 124, to perform optical character recognition (OCR) on images captured by the first imaging device 124. As another example, an imaging program included as part of the imaging programs 122b2 may cause the first imaging device 124, when executed by the device 124, to decode/interpret an indicia (e.g., barcode) printed on a target object (e.g., target object 108). Of course, it should be understood that the imaging programs 122b2 may include any suitable sets of executable instructions that cause the imaging devices 124, 126 to perform any suitable imaging tasks or combinations thereof.

A user may modify and/or otherwise configure the suite of imaging programs 122b2 stored on the leader device 122 by utilizing the smart imaging application 122b1. In this manner, a user may enable the leader device 112 to automatically configure the imaging devices 124, 126 to perform appropriate machine vision jobs for any given target object by defining all major/required target object types that the imaging devices 124, 126 may encounter. Namely, the user may configure programs in the imaging programs 122b2 to account for any target object that the conveyor belt (e.g., conveyor belt 106) may accommodate based on the belt 106 size, and the user may further link each target object to a specific program of the imaging programs 122b2 that the imaging devices 124, 126 may execute. Once the user has completed the initial configuration of the imaging programs 122*b*2, no further user intervention may be necessary, and the leader device 122 may automatically adjust the programs executed on the imaging devices 124, 126 to the object type traveling along the conveyor belt 106. Accordingly, the leader device 122 can configure the imaging devices 124, 126 to perform a by-object specific barcode decoding or machine vision inspection to reduce missed decodes or failed machine vision inspections by changing the imaging programs executed on the imaging devices 124, 126 based on the target object currently traveling along the conveyor belt.

The first imaging device 124 may include one or more processors 124*a*, one or more memories 124*b*, a networking interface 124*c*, an I/O interface 124*d*, an imaging assembly 124*e*, and, optionally, the smart imaging application 124*b*1 and an imaging program 124*b*2. Generally, the first imaging device 124 may be or include one or more of the scout devices 102*a-c*, and the smart imaging application 124*b*1 may be the smart imaging application 122*b*1, 126*b*1. The imaging assembly 124*e* may include a digital camera and/or digital video camera for capturing or taking digital images and/or frames. Each digital image may comprise pixel data that may be analyzed in accordance with instructions comprising the smart imaging application 124*b*1 and/or the imaging program 124*b*2, as executed by the one or more processors 124*a*, as described herein. The digital camera and/or digital video camera of, e.g., the imaging assembly 124*e* may be configured to take, capture, or otherwise generate digital images and, at least in some embodiments, may store such images in a memory (e.g., one or more memories 122*b*, 124*b*) of a respective device (e.g., leader device 122, first imaging device 124).

The second imaging device 126 may include one or more processors 126*a*, one or more memories 126*b*, a networking interface 126*c*, an I/O interface 126*d*, an imaging assembly 126*e*, as well as the smart imaging application 126*b*1 and an imaging program 126*b*2. Generally, the second imaging device 126 may be or include one or more of the set of machine vision cameras 104*a*1-3, 104*b*1-3, 104*c*1-3, and the smart imaging application 126*b*1 may be the smart imaging application 122*b*1, 124*b*1. The imaging assembly 126*e* may include a digital camera and/or digital video camera for capturing or taking digital images and/or frames. Each digital image may comprise pixel data that may be analyzed in accordance with instructions comprising the smart imaging application 126*b*1 and/or the imaging program 126*b*2, as executed by the one or more processors 126*a*, as described herein. The digital camera and/or digital video camera of, e.g., the imaging assembly 126*e* may be configured to take, capture, or otherwise generate digital images and, at least in some embodiments, may store such images in a memory (e.g., one or more memories 122*b*, 126*b*) of a respective device (e.g., leader device 122, second imaging device 126).

For example, the imaging assembly 124*e*, 126*e* may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 124*e*, 126*e* may capture 2D images, and related 2D image data, at the same or similar point in time as the 3D camera of the imaging assembly 124*e*, 126*e* such that the imaging devices 124, 126 can have both sets of 3D image data and 2D image data available for a particular surface, object, area, or scene at the same or similar instance in time. In various embodiments, the imaging assembly 124*e*, 126*e* may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

The imaging devices 124, 126 may also process the 2D image data/datasets and/or 3D image datasets for use by other devices (e.g., the leader device 122, the host device 114). For example, the one or more processors 122*a*, 124*a*, 126*a* may process the image data or datasets captured, scanned, or sensed by the imaging assembly 124*e*, 126*e*. The processing of the image data may generate post-imaging data that may include metadata, simplified data, normalized data, result data, status data, or alert data as determined from the original scanned or sensed image data. The image data and/or the post-imaging data may be sent to the leader device 122 executing, for example, the smart imaging application 122*b*1 for viewing, manipulation, and/or otherwise interaction. In other embodiments, the image data and/or the post-imaging data may be sent to a server for storage or for further manipulation. As described herein, the leader device 122, the first imaging device 124, the second imaging device 126, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 122*b*, 124*b*, 126*b* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 122*b*1, 124*b*1, 126*b*1, imaging programs 122*b*2, 124*b*2, 126*b*2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 122*a*, 124*a*, 126*a* (e.g., working in connection with the respective operating system in the one or more memories 122*b*, 124*b*, 126*b*) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 122*b*, 124*b*, 126*b* may store an operating system (OS) (e.g., Microsoft Windows, Linux, Unix, etc.) capable of facilitating the functionalities, apps, methods, or other software as discussed herein. Additionally, or alternatively, the smart imaging application 122*b*1, 124*b*1, 126*b*1 and/or the imaging programs 122*b*2, 124*b*2, 126*b*2 may also be stored in an external database (not shown), which is accessible or otherwise communicatively coupled to the leader device 122 via the network 130. The one or more memories 122*b*, 124*b*, 126*b* may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 122*b*1, 124*b*1, 126*b*1, and/or the imaging programs 122*b*2, 124*b*2, 126*b*2, where each may be configured to facilitate their various functionalities discussed herein. It should be appreciated that one or more other applications may be envisioned and that are executed by the one or more processors 122*a*, 124*a*, 126*a*.

The one or more processors 122*a*, 124*a*, 126*a* may be connected to the one or more memories 122*b*, 124*b*, 126*b* via a computer bus responsible for transmitting electronic data, data packets, or otherwise electronic signals to and from the one or more processors 122*a*, 124*a*, 126*a* and one or more memories 122*b*, 124*b*, 126*b* in order to implement or perform the machine readable instructions, methods, processes, elements or limitations, as illustrated, depicted, or described for the various flowcharts, illustrations, diagrams, figures, and/or other disclosure herein.

The one or more processors 122*a*, 124*a*, 126*a* may interface with the one or more memories 122*b*, 124*bb*, 126*b* via the computer bus to execute the operating system (OS). The one or more processors 122*a*, 124*a*, 126*a* may also interface with the one or more memories 122*b*, 124*b*, 126*b* via the computer bus to create, read, update, delete, or otherwise access or interact with the data stored in the one or more memories 122*b*, 124*b*, 126*b* and/or external databases (e.g., a relational database, such as Oracle, DB2, MySQL, or a NoSQL based database, such as MongoDB). The data stored in the one or more memories 122*b*, 124*b*, 126*b* and/or an external database may include all or part of any of the data or information described herein, including, for example, image data from images captures by the imaging assemblies 124*e*, 126*e*, and/or other suitable information.

The networking interfaces 122*c*, 124*c*, 126*c* may be configured to communicate (e.g., send and receive) data via one or more external/network port(s) to one or more networks or local terminals, such as network 130, described herein. In some embodiments, networking interfaces 122*c*, 124*c*, 126*c* may include a client-server platform technology such as ASP.NET, Java J2EE, Ruby on Rails, Node.js, a web service or online API, responsive for receiving and responding to electronic requests. The networking interfaces 122*c*, 124*c*, 126*c* may implement the client-server platform technology that may interact, via the computer bus, with the one or more memories 122*b*, 124*b*, 126*b* (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 122*c*, 124*c*, 126*c* may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 130. In some embodiments, network 130 may comprise a private network or local area network (LAN). Additionally, or alternatively, network 130 may comprise a public network such as the Internet. In some embodiments, the network 130 may comprise routers, wireless switches, or other such wireless connection points communicating to the leader device 122 (via the networking interface 122*c*), the first imaging device (via networking interface 124*c*), and the second imaging device 126 (via networking interface 126*c*) via wireless communications based on any one or more of various wireless standards, including by non-limiting example, IEEE 802.11a/b/c/g (WIFI), the BLUETOOTH standard, or the like.

The I/O interfaces 122*d*, 124*d*, 126*d* may include or implement operator interfaces configured to present information to an administrator or operator and/or receive inputs from the administrator or operator. An operator interface may provide a display screen (e.g., via the leader device 122, the first imaging device 124, and/or the second imaging device 126) which a user/operator may use to visualize any images, graphics, text, data, features, pixels, and/or other suitable visualizations or information. For example, the leader device 122, the first imaging device 124, and/or the second imaging device 126 may comprise, implement, have access to, render, or otherwise expose, at least in part, a graphical user interface (GUI) for displaying images, graphics, text, data, features, pixels, and/or other suitable visualizations or information on the display screen. The I/O interfaces 122*d*, 124*d*, 126*d* may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the leader device 122, the first imaging device 124, and/or the second imaging device 126. According to some embodiments, an administrator or user/operator may access the leader device 122, the first imaging device 124, and/or the second imaging device 126 to initiate imaging setting calibration, review images or other information, make changes, input responses and/or selections, and/or perform other functions.

As described above herein, in some embodiments, the leader device 122 may perform the functionalities as discussed herein as part of a "cloud" network or may otherwise communicate with other hardware or software components within the cloud to send, retrieve, or otherwise analyze data or information described herein.

Figure 2A:
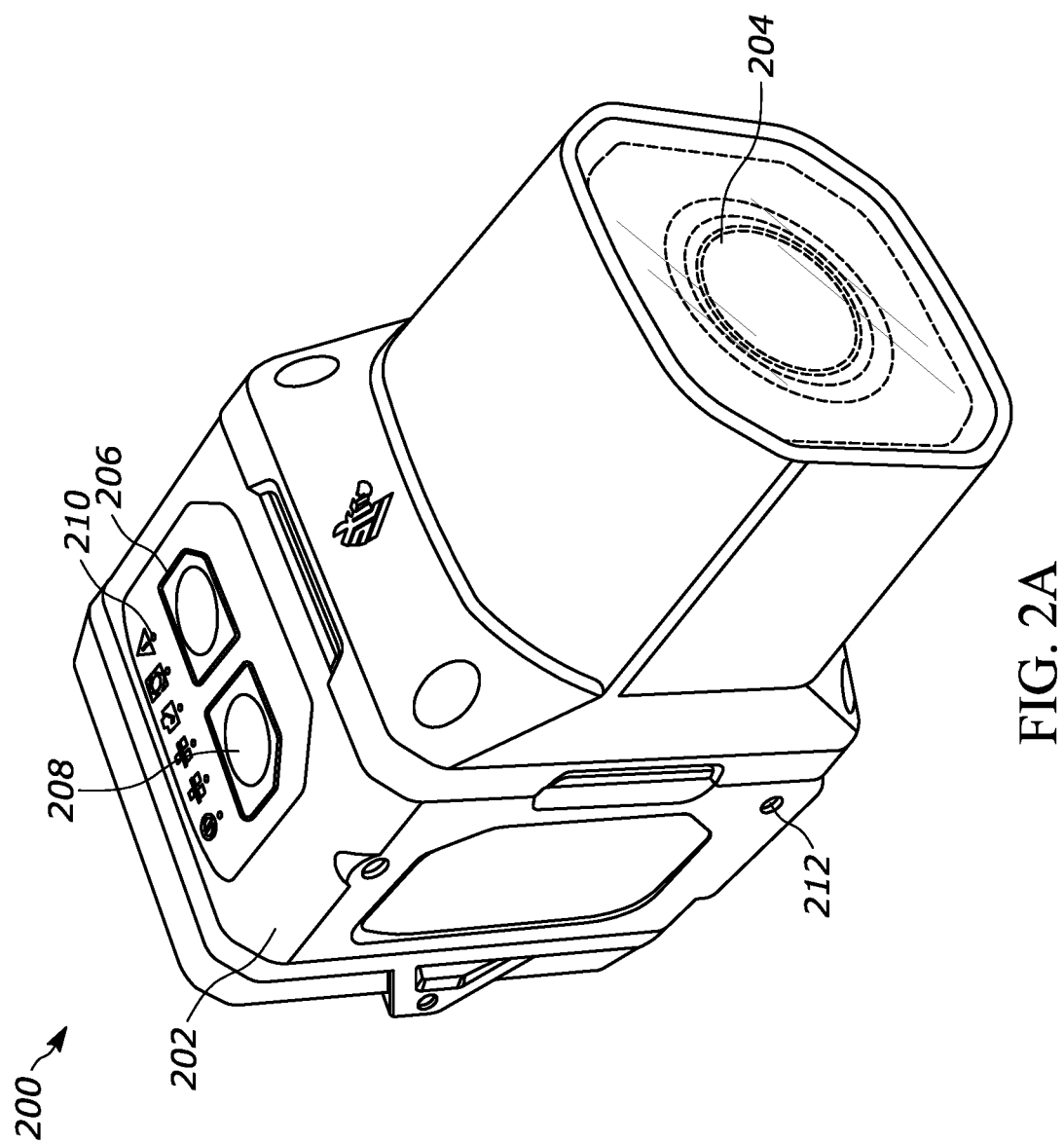
FIG. 2A is a perspective view of an imaging device from FIGS. 1A and 1B, in accordance with embodiments described herein.

FIG. 2A is a perspective view of an imaging device 200 (e.g., devices 102*a-c*, 104*a*1-3, 104*b*1-3, 104*c*1-3, 124, 126) of FIGS. 1A and 1B, in accordance with embodiments described herein. The imaging device 200 includes a housing 202, an imaging aperture 204, a user interface label 206, a dome switch/button 208, one or more light emitting diodes (LEDs) 210, and mounting point(s) 212. As previously mentioned, the imaging device 200 may automatically and/or in response to instructions received from a leader device (e.g., leader device 112, 122) and/or a user computing device initiate an application (e.g., smart imaging application 122*b*1, 124*b*1, 126*b*1, and/or the imaging programs 122*b*2, 124*b*2, 126*b*2) to allow a user to configure and/or execute a machine vision job and/or imaging settings of the imaging device 200. Of course, the imaging device 200 may independently adjust the imaging settings in response to the determinations made as part of the execution of the smart imaging application 122b1, 124b1, 126b1, and/or the imaging programs 122b2, 1224b2, 126b2, and/or the imaging device 200 may transmit an indication of these determinations to a leader device (e.g., leader device 112, 122) for review/acceptance by a user/operator.

For example, the determinations made as part of the execution of the smart imaging application 122b1, 124b1, 126b1, and/or the imaging programs 122b2, 1224b2, 126b2, may include instructions to adjust one or more settings related to the imaging aperture 204. Namely, assume that at least a portion of the analysis corresponding to the execution of the smart imaging application 122b1, 124b1, 126b1, and/or the imaging programs 122b2, 1224b2, 126b2, requires the imaging device 200 to maximize the brightness of the indicia and corresponding character string within a captured image. To accommodate this requirement, the imaging device 200 may increase the aperture size of the imaging aperture 204. Thus, the imaging device 200 may be configured to automatically adjust its own configuration to capture images with optimal image characteristics/qualities (e.g., brightness, sharpness), at least for the indicia and corresponding character string. Additionally, the imaging device 200 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 200 (e.g., via the dome switch/button 208) and to recognize when one or more functions, errors, and/or other actions have been performed or taken place with respect to the imaging device 200 (e.g., via the one or more LEDs 210). For example, the trigger function of a dome switch/button (e.g., dome/switch button 208) may enable a user to capture an image using the imaging device 200 and/or to display a trigger configuration screen of a user application (e.g., smart imaging application 122b1, 124b1, 126b1). The trigger configuration screen may allow the user to configure one or more triggers for the imaging device 200 that may be stored in memory (e.g., one or more memories 122b, 124b, 126b) for use in machine vision jobs.

As another example, the tuning function of a dome switch/button (e.g., dome/switch button 208) may enable a user to automatically and/or manually adjust the configuration of the imaging device 200 in and/or to display an imaging configuration screen of a user application (e.g., smart imaging application 122b1, 124b1, 126b1). The imaging configuration screen may allow the user to configure one or more configurations of the imaging device 200 (e.g., aperture size, exposure length, etc.) that may be stored in memory (e.g., one or more memories 122b, 124b, 126b) for use in machine vision jobs, as discussed herein. Further, and as discussed further herein, a user may utilize the imaging configuration screen (or more generally, the smart imaging application 122b1, 124b1, 126b1, and/or the imaging programs 122b2, 1224b2, 126b2) to configure specific parameters of a preferred machine vision job/task that enable the imaging device 200 to automatically perform imaging setting calibration in a manner that tailors the imaging settings resulting from execution of the smart imaging application 122b1, 124b1, 126b1 to the preferred machine vision job/task (e.g. imaging programs 122b2, 1224b2, 126b2). The user may then save the resulting imaging settings as part of a machine vision job that may be subsequently executed by the imaging device 200. The machine vision job may then instruct the imaging device 200 processors (e.g., one or more processors 124b, 126b) to automatically adjust the imaging settings of the imaging device 200 in accordance with the imaging settings determined as part of the execution of the smart imaging application 122b1, 124b1, 126b1, and/or the imaging programs 122b2, 1224b2, 126b2.

The mounting point(s) 212 may enable a user connecting and/or removably affixing the imaging device 200 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 200 may be optimally placed on a mounting device in a distribution center, manufacturing plant, warehouse, and/or other facility to image and thereby monitor the quality/consistency of products, packages, and/or other items as they pass through the imaging device's 200 FOV. Moreover, the mounting point(s) 212 may enable a user to connect the imaging device 200 to a myriad of accessory items including, but without limitation, one or more external illumination devices, one or more mounting devices/brackets, and the like.

In addition, the imaging device 200 may include several hardware components contained within the housing 202 that enable connectivity to a computer network (e.g., network 130). For example, the imaging device 200 may include a networking interface (e.g., networking interface 124, 126c) that enables the imaging device 200 to connect to a network, such as a Gigabit Ethernet connection and/or a Dual Gigabit Ethernet connection. Further, the imaging device 200 may include transceivers and/or other communication components as part of the networking interface to communicate with other devices (e.g., the leader device 122) via, for example, Ethernet/IP, PROFINET, Modbus TCP, CC-Link, USB 3.0, RS-232, and/or any other suitable communication protocol or combinations thereof.

FIG. 28 is a block diagram representative of an example logic circuit capable of implementing example methods and/or operations described herein. As an example, the example logic circuit may be capable of implementing one or more components of the example leader device 112, 122 of FIGS. 1A and 18. The example logic circuit of FIG. 28 is a processing platform 220 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 220 of FIG. 28 includes a processor 222 such as, for example, one or more microprocessors, controllers, and/or any suitable type of processor. The example processing platform 220 of FIG. 2B includes memory (e.g., volatile memory, non-volatile memory) 224 accessible by the processor 222 (e.g., via a memory controller). The example processor 222 interacts with the memory 224 to obtain, for example, machine-readable instructions stored in the memory 224 corresponding to, for example, the operations represented by the flowcharts of this disclosure. The memory 224 also includes the smart imaging application 224*a* and imaging programs 224*b* that are each accessible by the example processor 222. The smart imaging application 224*a* and the imaging programs 224*b* may comprise rule-based instructions, an artificial intelligence (AI) and/or machine learning-based model, and/or any other suitable algorithm architecture or combination thereof configured to, for example, change programs on imaging devices (e.g., first imaging device 230, second imaging device 240). To illustrate, the example processor 222 may access the memory 224 to execute the smart imaging application 224*a* and/or the imaging programs 224*b* when the first imaging device 230 and/or the second imaging device 240 (via the imaging assembly 239, 249) captures a set of image data comprising pixel data from a plurality of pixels. Additionally, or alternatively, machine-readable instructions corresponding to the example operations described herein may be stored on one or more removable media (e.g., a compact disc, a digital versatile disc, removable flash memory, etc.) that may be coupled to the processing platform 220 to provide access to the machine-readable instructions stored thereon.

Figure 2B:
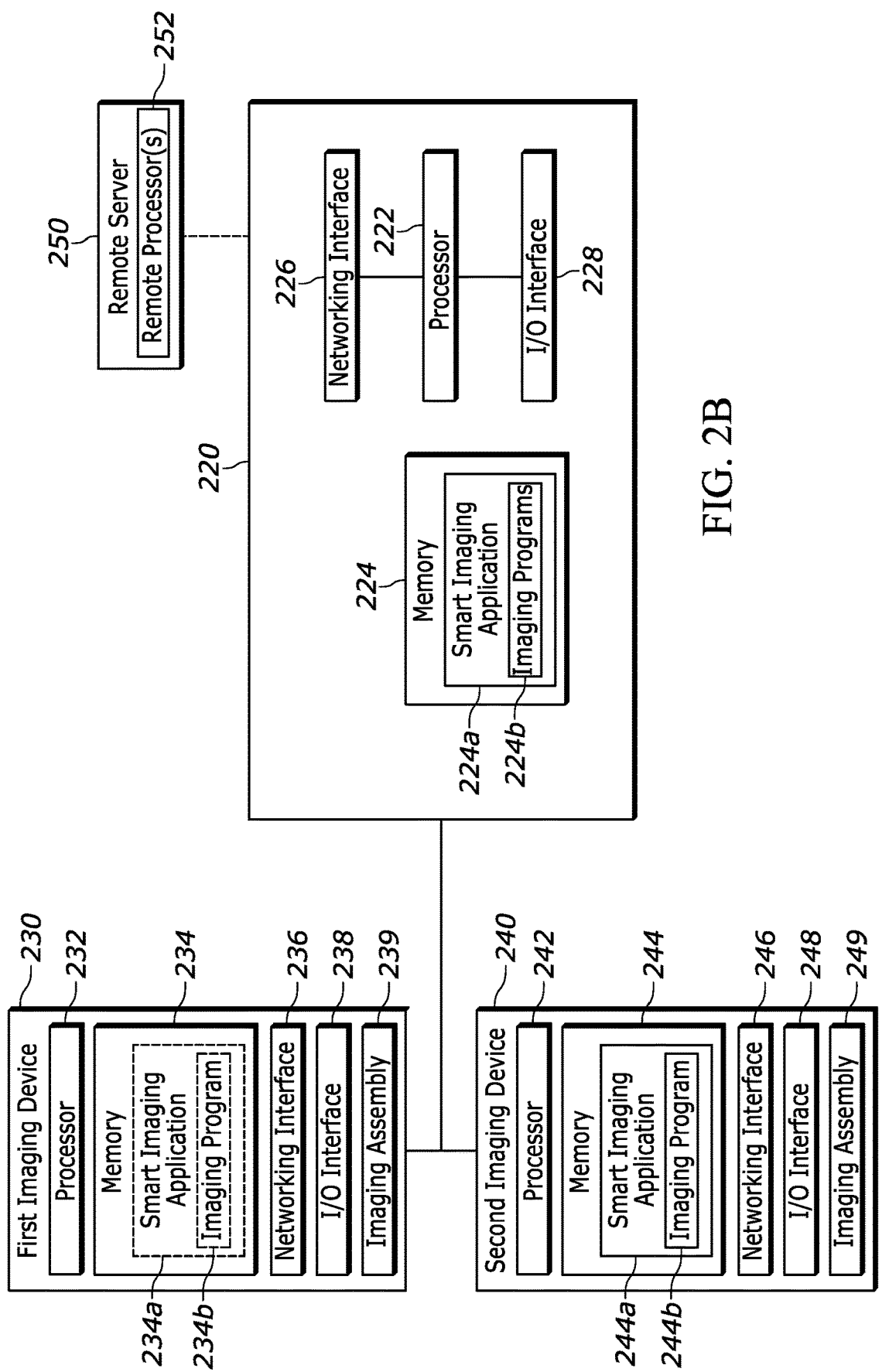
FIG. 2B is a block diagram of an example logic circuit for implementing example methods and/or operations described herein.

The example processing platform 220 of FIG. 2B also includes a networking interface 226 to enable communication with other machines via, for example, one or more networks. The example networking interface 226 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example processing platform 220 of FIG. 2B also includes input/output (I/O) interfaces 228 to enable receipt of user input and communication of output data to the user. Such user input and communication may include, for example, any number of keyboards, mice, USB drives, optical drives, screens, touchscreens, etc.

The example processing platform 220 is also connected to a first imaging device 230 which is configured to capture image data of target objects (e.g., target object 108). The first imaging device 230 may be or include imaging devices 102*a-c*, 124, 200, and may further include one or more processors 232, one or more memories 234, a networking interface 236, an I/O interface 238, and an imaging assembly 239. The first imaging device 230 may optionally include a smart imaging application 234*a* and an imaging program 234*b*.

The example processing platform 220 is also connected to a second imaging device 240 which is configured to capture image data of target objects (e.g., target object 108). The second imaging device 240 may be or include imaging devices 104*a*1-3, 104*b*1-3, 104*c*1-3, 126, 200, and may further include one or more processors 242, one or more memories 244, a networking interface 246, an I/O interface 248, and an imaging assembly 249. The second imaging device 240 may also include a smart imaging application 244*a* and an imaging program 244*b*.

Further, the example processing platform 220 may be connected to a remote server 250. The remote server 250 may include one or more remote processors 252, and may be configured to execute instructions to, for example, implement operations of the example methods described herein, as may be represented by the flowcharts of the drawings that accompany this description.

Figure 3:
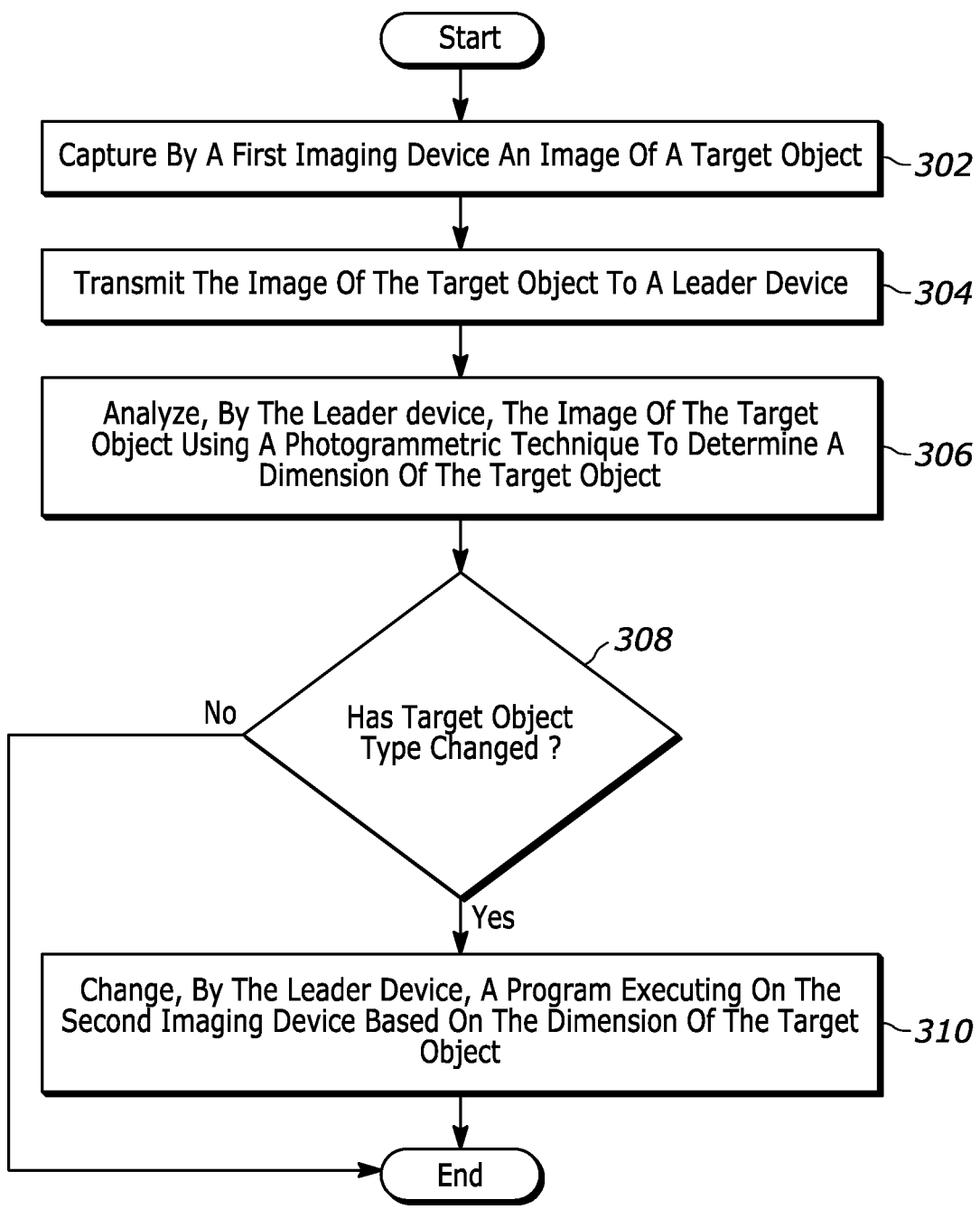
FIG. 3 is a flowchart representative of a method for changing programs on imaging devices, in accordance with embodiments described herein.

FIG. 3 is a flowchart representative of a method 300 for changing programs on imaging devices, in accordance with embodiments described herein. Generally, and as mentioned above, the method 300 for changing programs on imaging devices utilizes captured image data to determine a dimension of a target object, and thereafter to determine whether or not to change a program executing on an imaging device. More specifically, the method 300 enables the leader device (e.g., leader device 112, 122), the imaging devices (e.g., first imaging device 126, second imaging device 124) and/or another suitable device to enhance the speed, efficiency, and accuracy of changes to machine vision jobs for machine vision cameras. It is to be understood that any of the steps of the method 300 may be performed by, for example, the leader device 122, the first imaging device 126, the second imaging device 124, the smart imaging application 122*b*1, 126*b*1, 124*b*1, the one or more processors 122*a*, 124*a*, 126*a*, and/or any other suitable components or combinations thereof discussed herein.

At block 302, the method 300 includes capturing, by a first imaging device, an image of a target object. In certain aspects, the first imaging device may store a program configured to analyze the image of the target object in accordance with, for example, one or more machine vision tasks. In these aspects, the first imaging device may execute the program on the image of the target object, and may transmit results of executing the program to the leader device. In some aspects, the first imaging device may capture the image of the target object, and the image of the target object may comprise two or more images of the target object.

At block 304, the method 300 includes transmitting the image of the target object to a leader device that is communicatively coupled to the first imaging device and a second imaging device. The second imaging device may be different from the first imaging device, such that the first imaging device and the second imaging device may be located in different positions relative to one another (e.g., devices 102*a-c* and 104*a*1-3, 104*b*1-3, 104*c*1-3).

In certain aspects, the method 300 may further include transmitting the image of the target object to the leader device that is communicatively coupled to the first imaging device and the second imaging device, wherein the second imaging device is a machine vision camera array configured to execute the program. Further in these aspects, the program may be a machine vision job comprising one or more machine vision tasks, as described herein.

At block 306, the method 300 includes analyzing, by the leader device, the image of the target object using a photogrammetric technique to determine a dimension of the target object. In certain aspects, the method 300 may further include determining, by the leader device, that the target object represented in the image is a new target object based on the dimension of the new target object. In these aspects, the method 300 may further include retrieving a second program corresponding to the new target object, and changing, by the leader device, the program executing on the second imaging device from a first program to the second program based on the determining that the target object represented in the image is the new target object.

At block 308, the method 300 includes determining a dimension differential based on comparing the dimension of the target object to a prior object dimension, and comparing the dimension differential to a dimension differential threshold. Responsive to determining that the dimension differential exceeds the dimension differential threshold, the leader device may change the program executing on the second imaging device.

For example, a prior object dimension may be 30 centimeters (cm) in length, a dimension differential threshold may be 10 cm, and a first target object imaged by the first imaging device may have a length of 30 centimeters (cm). In this example, the leader device may compare the 30 cm to the prior object dimension (30 cm) and determine a dimension differential of 0 cm. As a result, the leader device may determine that the dimension differential does not exceed the dimension differential threshold (NO branch of block 308), and may accordingly determine that the program(s) currently executing on the second imaging device should not be changed.

Further to the above example, a second target object imaged by the first imaging device may have a length of 60 cm. In this example, the leader device may compare the 60 cm to the prior object dimension (30 cm) and determine a dimension differential of 30 cm. As a result, the leader device may determine that the dimension differential does exceed the dimension differential threshold (YES branch of block 308), and may accordingly determine that the program(s) currently executing on the second imaging device should be changed to correspond to the second target object.

At block 310, the method 300 includes changing, by the leader device, a program executing on the second imaging device based on the dimension of the target object. In particular, and in certain aspects, changing the program executing on the second imaging device may include changing at least one of (i) a focus value, (ii) an exposure value, (iii) a scene-lighting configuration value, (iv) a program inspection step, and/or (v) an activity status of the second imaging device. For example, changing a scene-lighting configuration value in order to change the intensity, timing, and/or other parameter related to the lighting used to capture images by the second imaging device.

As another example, changing a program inspection step may include changing a particular machine vision task, such as edge detection, object detection, image classification, barcode decoding, and/or any other suitable task or combinations thereof, specified for execution by the second imaging device. In this example, the leader device may cause the second imaging device to execute a different machine vision task, perform the machine vision tasks in a different order, and/or may adjust parameters of the machine vision tasks currently executed by the second imaging device. A first imaging program configured for a first target object may include the same machine vision tasks as a second imaging program configured for a second target object, but each machine vision task included as part of the first imaging program may include a significantly smaller region of interest (ROI) than the machine vision tasks included as part of the second imaging program. Thus, when the leader device changes the imaging program executing on the second imaging device from the first imaging program to the second imaging program, the changes comprise adjustments to the ROI for each machine vision task included as part of both the first imaging program and the second imaging program.

Additionally, or alternatively, the changes to the imaging program executing on the second imaging device may include changing the activity status of the second imaging device. Generally, the activity status of the second imaging device relates to whether or not the second imaging device is active in order to capture images of the target object, for example, as the target object travels along a conveyor belt (e.g., conveyor belt 106). In particular, if the activity status of the second imaging device is set to "on" or "active," then the second imaging device may capture images of the target object, and if the activity status of the second imaging device is set to "off" or "inactive," then the second imaging device may not capture images of the target object. If the first imaging device performs all necessary imaging tasks for the particular target object, or only a subset of imaging devices comprising the second imaging device (e.g., the set of machine vision cameras 104a1-3, 104b1-3, 104c1-3) are require to perform the necessary imaging tasks for the particular target object, then the leader device may deactivate some/all of the imaging devices comprising the second imaging device. In this manner, the leader device may generate energy savings for the user by efficiently managing thermal and computational loads on the second imaging device.

Of course, it is to be appreciated that the actions of the method 300 may be performed in any suitable order and any suitable number of times in order to change the program(s) executing on any of the first imaging device, the second imaging device, and/or any other suitable device described herein or combinations thereof.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for changing programs on imaging devices, the method comprising:
  capturing, by a first imaging device, an image of a target object;
  transmitting the image of the target object to a leader device that is communicatively coupled to the first imaging device and a second imaging device, wherein the second imaging device is different from the first imaging device;
  analyzing, by the leader device, the image of the target object using a photogrammetric technique to determine a dimension of the target object; and
  determining, by the leader device, that the target object represented in the image is a new target object based on the dimension of the new target object;
  retrieving a second program corresponding to the new target object; and
  changing, by the leader device, a program executing on the second imaging device from a first program to the second program based on the determining that the target object represented in the image is the new target object,
  wherein the second imaging device is a machine vision camera array configured to execute the program, and wherein the program is a machine vision job script comprising one or more machine vision tasks.

2. The method of claim 1, wherein the program is stored on the first imaging device, and the method further comprises:
  executing, by the first imaging device, the program on the image of the target object; and transmitting results of executing the program to the leader device.

3. The method of claim 1, further comprising:
analyzing, by the leader device, the image of the target object using a photogrammetric technique to determine a dimension of the target object;
determining a dimension differential based on comparing the dimension of the target object to a prior object dimension;
comparing the dimension differential to a dimension differential threshold; and
responsive to determining that the dimension differential exceeds the dimension differential threshold, changing, by the leader device, the program executing on the second imaging device.

4. The method of claim 1, further comprising:
changing, by the leader device, the program executing on the second imaging device, wherein changes to the program include changing at least one of (i) a focus value, (ii) an exposure value, (iii) a scene-lighting configuration value, (iv) a program inspection step, (v) an activity status of the second imaging device.

5. The method of claim 1, further comprising:
capturing, by the first imaging device, the image of the target object, wherein the image of the target object comprises two or more images of the target object.

6. A system for changing programs on imaging devices, the system comprising:
a first imaging device configured to capture an image of a target object; and
a leader device executing an application, wherein the leader device is communicatively coupled to the first imaging device and is configured to:
receive the image of the target object,
analyze the image of the target object using a photogrammetric technique to determine a dimension of the target object,
determine that the target object represented in the image is a new target object based on the dimension of the new target object;
retrieve a second program corresponding to the new target object; and
change a program executing on the second imaging device from a first program to the second program based on the determining that the target object represented in the image is the new target object,
wherein the second imaging device is a machine vision camera array configured to execute the program, and wherein the program is a machine vision job script comprising one or more machine vision tasks.

7. The system of claim 6, wherein the program is stored on the first imaging device, and the first imaging device is further configured to:
execute the program on the image of the target object; and
transmit results of executing the program to the leader device.

8. The system of claim 6, wherein the leader device is further configured to:
analyze the image of the target object using a photogrammetric technique to determine a dimension of the target object;
determine a dimension differential based on comparing the dimension of the target object to a prior object dimension;
compare the dimension differential to a dimension differential threshold; and
responsive to determining that the dimension differential exceeds the dimension differential threshold, change the program executing on the second imaging device.

9. The system of claim 6, wherein the leader device is further configured to:
change the program executing on the second imaging device, wherein changes to the program include changing at least one of (i) a focus value, (ii) an exposure value, (iii) a scene-lighting configuration value, (iv) a program inspection step, (v) an activity status of the second imaging device.

10. The system of claim 6, wherein the first imaging device is further configured to:
capture the image of the target object, wherein the image of the target object comprises two or more images of the target object.

11. A device for changing programs on imaging devices, the device comprising:
one or more processors; and
a non-transitory computer-readable memory coupled to the imaging apparatus and the one or more processors, the memory storing instructions thereon that, when executed by the one or more processors, cause the one or more processors to:
receive an image of a target object captured by a first imaging device,
analyze the image of the target object using a photogrammetric technique to determine a dimension of the target object, and
determine that the target object represented in the image is a new target object based on the dimension of the new target object;
retrieve a second program corresponding to the new target object; and
change a program executing on the second imaging device from a first program to the second program based on the determining that the target object represented in the image is the new target object,
wherein the second imaging device is a machine vision camera array configured to execute the program, and wherein the program is a machine vision job script comprising one or more machine vision tasks.

12. The device of claim 11, wherein the program is stored on the first imaging device, and the instructions, when executed, further cause the one or more processors to:
receive results of executing the program on the image of the target object from the first imaging device; and
disable the second imaging device from capturing images of the target object.

13. The device of claim 11, wherein the instructions, when executed, further cause the one or more processors to:
analyze the image of the target object using a photogrammetric technique to determine a dimension of the target object;
determine a dimension differential based on comparing the dimension of the target object to a prior object dimension;
compare the dimension differential to a dimension differential threshold; and
responsive to determining that the dimension differential exceeds the dimension differential threshold, change the program executing on the second imaging device.

14. The device of claim 11, wherein the instructions, when executed, further cause the one or more processors to:
change the program executing on the second imaging device, wherein changes to the program include changing at least one of (i) a focus value, (ii) an exposure value, (iii) a scene-lighting configuration value, (iv) a program inspection step, (v) an activity status of the second imaging device.

\* \* \* \* \*